United States Patent
Kim et al.

(10) Patent No.: US 7,944,275 B2
(45) Date of Patent: May 17, 2011

(54) VPP PUMPING CIRCUIT AND VPP PUMPING METHOD USING THE SAME

(75) Inventors: Jae Hoon Kim, Icheon-si (KR); Bong Hwa Jeong, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 106 days.

(21) Appl. No.: 12/315,007

(22) Filed: Nov. 26, 2008

(65) Prior Publication Data

US 2009/0237147 A1    Sep. 24, 2009

(30) Foreign Application Priority Data

Mar. 18, 2008  (KR) .................. 10-2008-0024990

(51) Int. Cl.
   G05F 1/10    (2006.01)
(52) U.S. Cl. ...................................... 327/535; 327/543
(58) Field of Classification Search .................. 327/530, 327/534, 535, 537, 538, 540, 541, 543; 363/59, 363/60
   See application file for complete search history.

(56) References Cited

U.S. PATENT DOCUMENTS

| | | | |
|---|---|---|---|
| 5,291,446 A | 3/1994 | Van Buskirk et al. | |
| 6,414,881 B1 * | 7/2002 | Fujii et al. | 365/189.09 |
| 6,459,643 B2 * | 10/2002 | Kondo et al. | 365/226 |
| 6,897,709 B2 * | 5/2005 | Henry | 327/536 |
| 7,030,681 B2 * | 4/2006 | Yamazaki et al. | 327/534 |
| 7,289,380 B2 | 10/2007 | Kim et al. | |
| 7,439,794 B2 * | 10/2008 | Takeyama et al. | 327/536 |
| 7,456,680 B2 * | 11/2008 | Gyohten et al. | 327/541 |
| 2007/0007621 A1 * | 1/2007 | Omura et al. | 257/529 |
| 2008/0170446 A1 * | 7/2008 | Kwon et al. | 365/189.09 |

FOREIGN PATENT DOCUMENTS

| | | |
|---|---|---|
| KR | 10-2005-0078610 A | 8/2005 |
| KR | 10-2006-0030652 A | 4/2006 |

* cited by examiner

*Primary Examiner* — Lincoln Donovan
*Assistant Examiner* — Sibin Chen
(74) *Attorney, Agent, or Firm* — John P. White; Cooper & Dunham LLP

(57) ABSTRACT

Disclosed are a high voltage pumping circuit and a VPP pumping method using the same. The high voltage pumping circuit includes an initializing unit for initializing a high voltage in response to a first enable signal, a first pump for pumping the high voltage in response to the first enable signal, a second pump for pumping the high voltage in response to a second enable signal and a first mode signal, and a mode signal transmitting unit for generating a second mode signal in response to the second enable signal and the first mode signal. The driving of the initializing unit and the first pump is controlled in response to the first pump and the second mode signal.

26 Claims, 4 Drawing Sheets

VPP PUMPING CIRCUIT AND VPP PUMPING METHOD USING THE SAME

TECHNICAL FIELD

The present disclosure relates to a semiconductor memory device, and more particularly to a high voltage VPP pumping circuit capable of satisfying both reliability and efficiency by pumping a high voltage VPP to a predetermined level using a tripler pump and then pumping the high voltage VPP using a doubler pump and a VPP pumping method using the same.

BACKGROUND

Generally, a semiconductor memory device is provided with an external voltage VDD and a ground voltage VSS from an exterior and generates and uses an internal voltage required for internal operations. The voltages required for internal operations of a memory device are a core voltage Vcore supplied to a memory core region, a high voltage VPP used when overdriving or driving word lines, a back bias voltage VBB supplied as a bulk voltage of NMOS transistors of a core region and so on.

Here, the core voltage Vcore may be supplied by reducing the external voltage VDD input from an exterior to a predetermined level. However, the high voltage VPP has a higher voltage level than the external voltage VDD and the back bias voltage VBB maintains a lower voltage level than the ground voltage VSS supplied from an exterior. Therefore, in order to supply the high voltage VPP and the back bias voltage VBB, a charge pumping circuit is required to supply charge for the high voltage VPP and the back bias voltage VBB.

There are two types of conventional high voltage VPP pumping circuits, one using a high voltage VPP pump 2 of doubler structure, as shown in FIG. 1A, and the other using a high voltage VPP pump 3 of tripler structure, as shown in FIG. 1B.

The high voltage VPP pumping circuits as shown in FIGS. 1A and 1B are driven in response to a power up signal PWRUP which is enabled to a high level when the external voltage VDD level is over a predetermined level in an initial operation section of a semiconductor memory device.

Generally, since the high voltage VPP pump 2 of doubler structure has a maximum pumping efficiency reaching 50%, it is advantageous as compared with the high voltage VPP pump 3 of tripler structure having a maximum pumping efficiency of 33% in the aspect of efficiency.

On the other hand, the high voltage VPP pump 3 of tripler structure is advantageous in the aspect of reliability. This is because the high voltage VPP pump 2 of doubler structure can pump the high voltage VPP to a level twice as high as the external voltage VDD, whereas the high voltage VPP pump 3 of tripler structure can pump the high voltage VPP to a level three times as high as the external voltage VDD.

However, a conventional high voltage VPP pumping circuit selectively using one of the high voltage VPP pump 2 of doubler structure and the high voltage VPP pump 3 of tripler structure is unable to satisfying both reliability and efficiency.

SUMMARY

In an aspect of the present disclosure, a high voltage VPP pumping circuit and a high voltage VPP pumping method using the same are provided that are capable of providing both reliability and efficiency by pumping a high voltage VPP to a predetermined level using a tripler pump and then pumping the high voltage VPP using a doubler pump.

In an embodiment, a high voltage pumping circuit includes an initializing unit which initializes a high voltage in response to a first enable signal, a first pump which pumps the high voltage in response to the first enable signal, a second pump which pumps the high voltage in response to a second enable signal and a first mode signal, and a mode signal transmitting unit which generates a second mode signal in response to the second enable signal and the first mode signal. Here, the driving of the initializing unit and the first pump is controlled in response to the second mode signal.

The first enable signal can be enabled in response to a level of the external voltage.

The initializing unit and the first pump can selectively be enabled by the first enable signal.

The initializing unit can include a first driving unit which drives a first node in response to the first enable signal and the second mode signal, and a second driving unit which initializes the high voltage to the external voltage in response to an output signal of the first driving unit.

The first driving unit can include a first logic unit performing an OR operation in response to the first enable signal and the second mode signal, and a buffer unit buffering an output signal of the first logic unit.

The buffer unit includes a first pull-up device connected between the external voltage and the first node and comprising pull-up drive the first node in response to an output signal of the logic unit, a first pull-down device connected between the first node and a ground voltage and comprising pull-down drive the first node in response to the output signal of the logic unit, a second pull-up device connected between the external voltage and a second node and comprising pull-up drive the second node in response to an output signal of the first node, a second pull-down device connected between the second node and the ground voltage and comprising pull-down drive the second node in response to the output signal of the first node, a third pull-up device connected between the external voltage and a third node and comprising pull-up drive the third node in response to an output signal of the second node, and a third pull-down device connected between the third node and the ground voltage and comprising pull-down drive the third node in response to the output signal of the second node.

The second driving unit can include a first switching device connected between the high voltage and a fourth node and comprising turn on in response to an output signal of the first driving unit, and a second switching device connected between the fourth node and the external voltage and comprising turn on in response to the second mode signal.

The initializing unit can include a level shifting unit connected between the first driving unit and the second driving unit and driven in response to the first enable signal.

The level shifting unit can shift the level of the external voltage to the level of the high voltage.

The first pump can be a high voltage pump of tripler structure.

The second enable signal can be enabled in response to the level of the high voltage.

The first mode signal can be disabled in a low power mode.

The second pump can be a high voltage pump of doubler structure.

The second mode signal can be disabled in response to enable of the second enable signal which is enabled in a low power mode.

The mode signal transmitting unit can include a logic unit performing an OR operation in response to the second enable signal and the first mode signal, and an inverter buffering an output signal of the logic unit.

In another exemplary embodiment, a high voltage pumping circuit includes an enable signal generating unit which generates first and second enable signals, an initializing unit which initializes the high voltage in response to the first enable signal and a second mode signal, a first pump which pumps the high voltage in response to the first enable signal and the second mode signal, a second pump which pumps the high voltage in response to the second enable signal and a first mode signal, and a mode signal transmitting unit which generates the second mode signal in response to the second enable signal and the first mode signal.

The enable signal generating unit can include an external voltage sensing unit which generates the first enable signal which is enabled in response to the level of the external voltage, and a high voltage sensing unit which generates the second enable signal which is enabled in response to the level of the high voltage.

The first enable signal can selectively be enabled according to the level of the external voltage.

The initializing unit and the first pump can selectively be enabled by the first enable signal.

In still another embodiment, a high voltage pumping method includes initializing a high voltage in response to a first enable signal, pumping the high voltage by a first pump in response to the first enable signal, sensing a level of the high voltage and generating a second enable signal, and pumping the high voltage by a second pump in response to the second enable signal.

The first enable signal can be enabled in response to a level of an external voltage.

The high voltage can be is initialized to the external voltage in response to the first enable signal and a second mode signal.

The first pump can be a high voltage pump of tripler structure.

The second enable signal is enabled in response to a level of the high voltage.

The second pump is a high voltage pump of doubler structure.

The high voltage pumping method further includes generating a second mode signal in response to the second enable signal and a first mode signal.

The first mode signal is disabled in a low power mode.

The second mode signal is disabled in enable of the second enable signal which is enabled in a low power mode.

BRIEF DESCRIPTION OF THE DRAWINGS

The above and other aspects, features and other advantages of the subject matter of the present disclosure will be more clearly understood from the following detailed description taken in conjunction with the accompanying drawings, in which.

DETAILED DESCRIPTION OF PREFERRED EMBODIMENTS

Hereinafter, embodiment of the present disclosure will be described with reference to accompanying drawings. However, the embodiment is for illustrative purposes only and are not intended to limit the scope of the invention and the claims appended hereto.

Figure 1A:
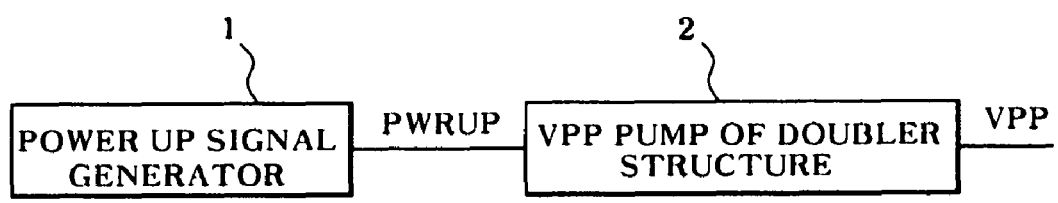
FIG. 1A is a view showing the structure of a doubler high voltage VPP pumping circuit according to a prior art.
Figure 1B:
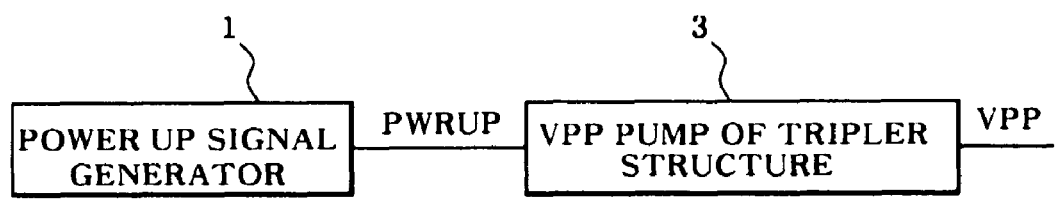
FIG. 1B is a view showing the structure of a tripler high voltage VPP pumping circuit according to a prior art.
Figure 2:
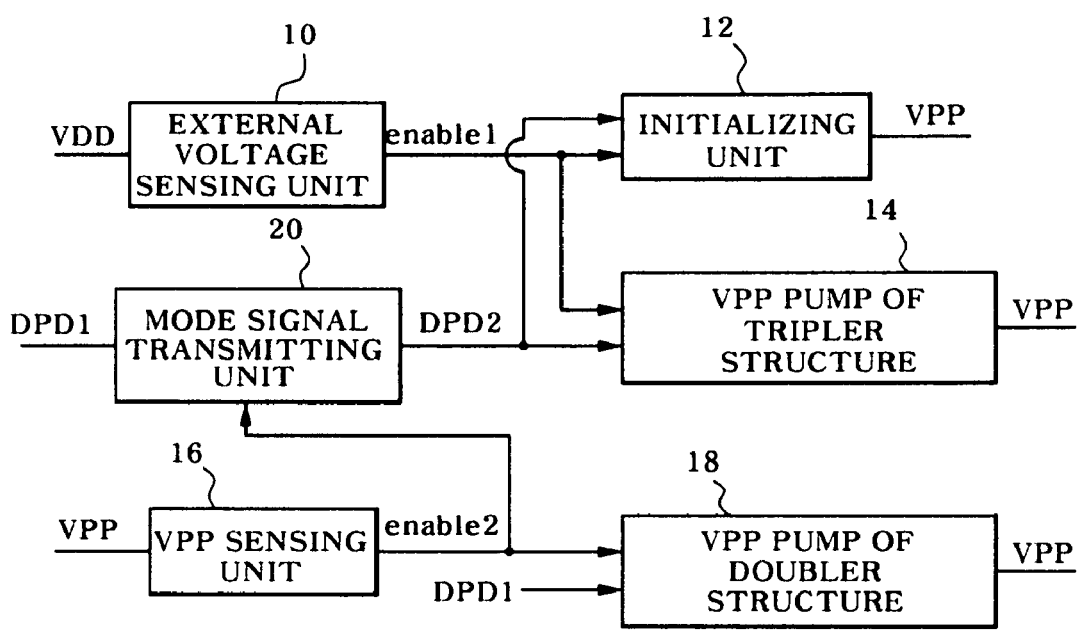
FIG. 2 is a block diagram showing an embodiment of a structure of a VPP pumping circuit according to an exemplary embodiment of the present disclosure.
Figure 3:
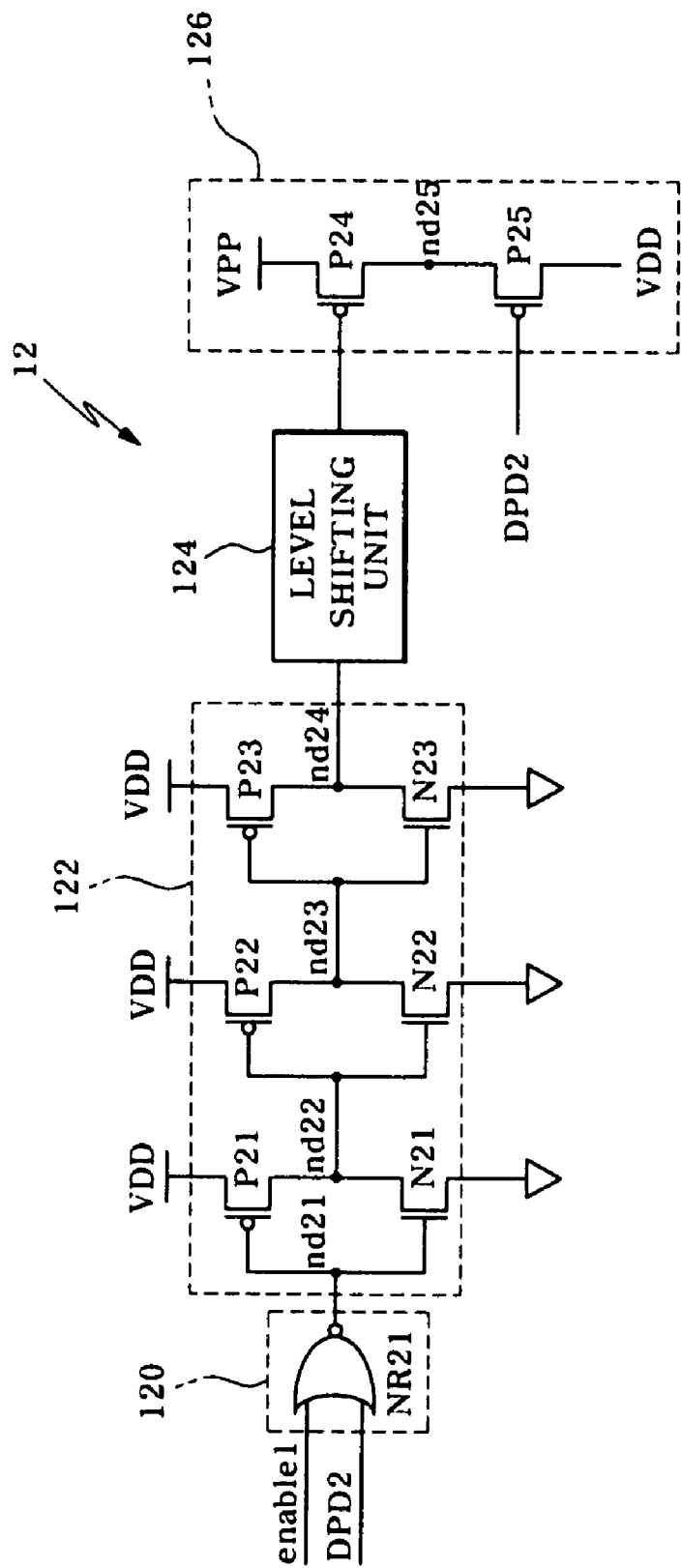
FIG. 3 is a view illustrating an embodiment of a structure of an initializing unit in the high voltage VPP pumping circuit shown in FIG. 2.
Figure 4:
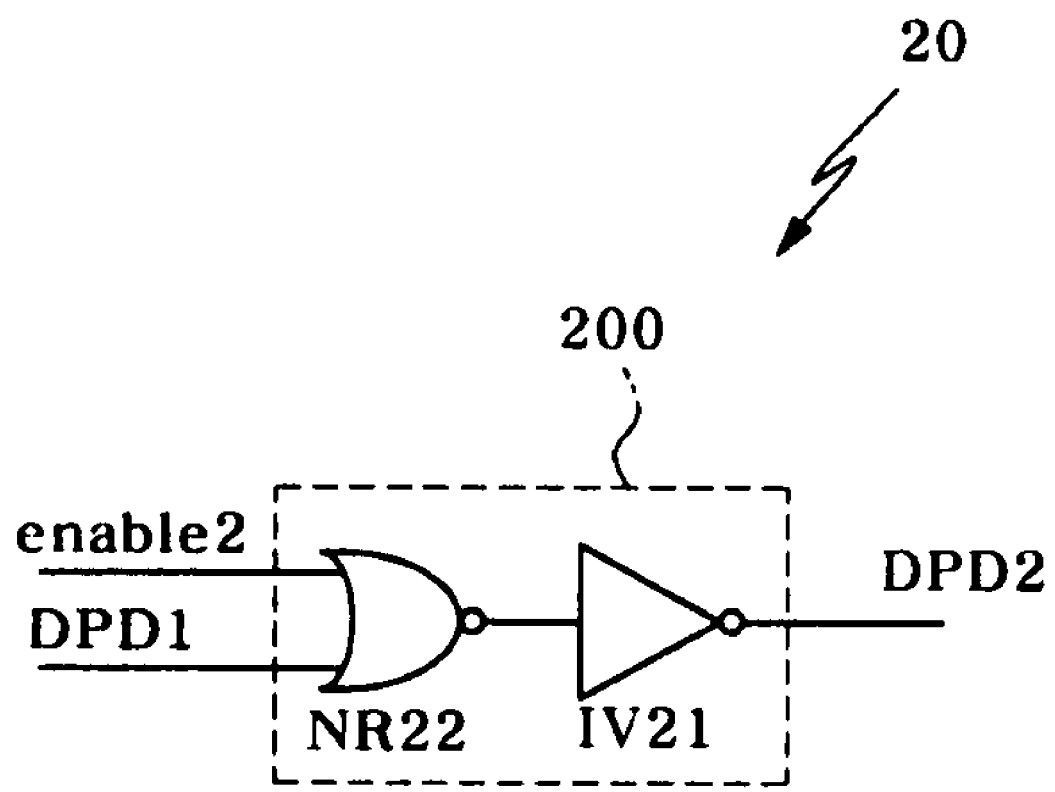
FIG. 4 is a view illustrating an embodiment of a structure of a mode signal transmitting unit in the high voltage VPP pumping circuit shown in FIG. 2.

FIG. 2 is a block diagram showing an embodiment of a structure of a high voltage VPP pumping circuit according to an exemplary embodiment of the present disclosure, FIG. 3 is a diagram illustrating an embodiment of a structure of an initializing unit in the high voltage VPP pumping circuit shown in FIG. 2, and FIG. 4 is a diagram illustrating an embodiment of a structure of a mode signal transmitting unit in the high voltage VPP pumping circuit shown in FIG. 2.

As shown in FIG. 2, the high voltage VPP pumping circuit in an embodiment of the present disclosure includes an external voltage sensing unit 10 which senses an external voltage VDD and generates a first enable signal enable1, an initializing unit 12 which initializes a high voltage VPP in response to the first enable signal enable1 and a second mode signal DPD2, a high voltage VPP pump 14 of tripler structure which pumps the high voltage VPP in response to the first enable signal enable1 and the second mode signal DPD2, a high voltage VPP sensing unit 16 which senses the high voltage VPP and generates a second enable signal enable2, a high voltage VPP pump 18 of doubler structure which pumps the high voltage VPP in response to the second enable signal enable2 and a first mode signal DPD1, and a mode signal transmitting unit 20 which generates the second mode signal DPD2 in response to the first mode signal DPD1 and the second enable signal enable2.

Here, the first mode signal DPD1 is a signal which is enabled to a high level (or a low level depending on an embodiment) in a low power mode, and the low power mode refers to a mode in which operations of periphery circuits are stopped in a standby state to reduce unnecessary power consumption.

As illustrated in FIG. 3, the initializing unit 12 includes a NOR gate NR21 which performs an OR operation in response to the first enable signal enable1 and the second mode signal DPD2, a buffer unit 122 which buffers an output signal of a node nd21, a level shifting unit 124 which shifts an external voltage VDD level to a high voltage VPP in response to an output signal of the buffer unit 122, and a driving unit 126 which initializes the high voltage VPP to the external voltage VDD in response to an output signal of the level shifting unit 124.

The buffer unit 122 includes a PMOS transistor P21 which is connected between the external voltage VDD and a node nd22 and pull-up drives the node nd22 in response to an output signal of the node nd21, a NMOS transistor N21 which is connected between the node nd22 and a ground voltage VSS and pull-down drives the node nd22 in response to the output signal of the node nd21, a PMOS transistor P22 which is connected between the external voltage VDD and a node nd23 and pull-up drives the node nd23 in response to an output signal of the node nd22, a NMOS transistor N22 which is connected between the node nd23 and the ground voltage VSS and pull-down drives the node nd23 in response to the output signal of the node nd22, a PMOS transistor P23 which is connected between the external voltage VDD and a node nd24 and pull-up drives the node nd24 in response to an output signal of the node nd23, and a NMOS transistor N23 which is connected between the node nd24 and the ground voltage VSS and pull-down drives the node nd24 in response to the output signal of the node nd23.

The driving unit 126 includes a PMOS transistor P24 which is connected between the high voltage VPP and a node nd25 and is turned on in response to an output signal of the level shifting unit 124, and a PMOS transistor P25 which is connected between the node nd25 and the external voltage VDD and is turned on in response to the second mode signal DPD2.

As illustrated in FIG. 4, the mode signal transmitting unit 20 comprises a second logic unit 200 including a NOR gate NR22 performing an OR operation in response to the first mode signal DPD1 and the second enable signal enable2, and an inverter IV21.

Hereinafter, an operation of the high voltage VPP pumping circuit comprising as described above will be discussed in detail.

First, the external voltage sensing unit 10 senses a level of the external voltage VDD and generates the first enable signal enable1 when the sensed voltage level is below a predetermined level. At this time, since the high voltage VPP has not yet been pumped, the high voltage VPP sensing unit 15 generates a second enable signal enable2 of low level. In addition, if it is not a low power mode, the first mode signal DPD1 is in a low level. Accordingly, the mode signal transmitting unit 20 outputs the second mode signal DPD2 of low level in response to the second enable signal enable2 of low level.

As discussed above, when the external voltage sensing unit 10 generates the first enable signal enable1 of low level, that is, when the level of the external voltage VDD is below a predetermined level, the high voltage VPP pump 14 of tripler structure is not driven but the initializing unit is driven. As illustrated in FIG. 3, since the second mode signal DPD2 is in a low level when it is not a low power mode, if the enable signal enable1 of low level is input, the output signal of the node nd21 becomes a high level.

By the high level output signal of the node nd21, the NMOS transistor N21, the PMOS transistor P22 and the NMOS transistor N23 are turned on. Thereby, the node nd24 becomes a low level and the level shifting unit 124 becomes a low level. Accordingly, the PMOS transistor P24 of the driving unit 126 is turned on in response to a low level output signal of the level shifting unit 124, and the PMOS transistor P25 is turned on by the second mode signal DPD2, thereby initializing the high voltage VPP to the external voltage VDD.

Meanwhile, when the level of the external voltage VDD sensed through the external voltage sensing unit 10 is over a predetermined level, the first enable signal enable1 is generated as a high level. At this time, since the high voltage VPP is pumped by the first enable signal enable1 of high level, the high voltage VPP sensing unit 16 generates the second enable signal enable2. In addition, when it is not a low power mode, the first mode signal DPD1 is in a low level, and thus the mode signal transmitting unit 20 outputs the second mode signal DPD2 of high level in response to the second enable signal enable2 of high level.

When the external voltage sensing unit 10 generates the first enable signal enable1 of high level, that is, when the external voltage VDD is over a predetermined level, the high voltage VPP pump 14 of tripler structure is driven to pump the high voltage VPP. At this time, the initializing unit 12 is not driven. That is, as shown in FIG. 3, when it is not a lower power mode, the second mode signal DPD2 is in a low level. Therefore, when the first enable signal enable1 of high level is input, the output signal of the node nd21 becomes a low level. Thereby, the PMOS transistor P21, the NMOS transistor N22 and the PMOS transistor P23 are turned on, the node nd24 is driven to a high level and the level shifting unit 124 outputs a high level signal. In response to the high level output signal of the level shifting unit 124, the PMOS transistor P24 which initializes the high voltage VPP to the external voltage VDD is turned off. At this time, when the output voltage of the node nd24 having the level of the external voltage VDD is lower than the threshold voltage of the PMOS transistor P24, the PMOS transistor P24 is turned on, to perform an initializing operation. Therefore, the level shifting unit 124 shifts the level of the external voltage VDD to the level of the high voltage VPP.

Next, the high voltage VPP sensing unit 16 senses the level of the high voltage VPP and generates the second enable signal enable2 of high level when the sensed voltage level is above a predetermined level. The high voltage VPP pump 18 of doubler structure which received the second enable signal enable2 of high level pumps the high voltage VPP. At this time, the high voltage VPP pump 14 of tripler structure and the initializing unit 12 are not driven. That is, as illustrated in FIG. 4, when it is not a low power mode, the first mode signal DPD1 is in a low level. Therefore, when the second enable signal enable2 of high level is input, the second mode signal DPD2 becomes a high level. When the second mode signal DPD2 is at the high level, the high voltage VPP pump 14 of tripler structure and the initializing unit 12 are in a low power mode.

As described above, when the level of the external voltage VDD does not reach a predetermined level, the high voltage VPP pumping circuit of the present disclosure initializes the high voltage VPP to the external voltage VDD through the initializing unit 12. When the level of the external voltage VDD reaches a predetermined level, the high voltage VPP pumping circuit pumps the high voltage VPP to a predetermined level using the high voltage VPP pump 14 of tripler structure and then pumps the high voltage VPP using the high voltage VPP pump 18 of doubler structure. At this time, while the high voltage VPP pump 18 of doubler structure operates, the power supply to the high voltage VPP pump 14 of tripler structure is isolated and thus the high voltage VPP pump 14 of tripler structure does not operate. Therefore, according to the level of the high voltage VPP, the high voltage VPP pump 14 of tripler structure pumps the high voltage VPP in an operation region requiring reliability, whereas the high voltage VPP pump 18 of doubler structure pumps the high voltage VPP in an operation region requiring efficiency.

As described above, by performing respective high voltage VPP pumping operations in response to the first and second enable signals enable1 and enable 2 which are enabled in all operation regions by the level of the high voltage VPP, it is possible to reduce the current consumption according to the operation region.

In summary, by pumping the high voltage VPP to a predetermined level through the high voltage VPP pump 14 of tripler structure which can pump the level of the external voltage VDD by three times and then pumping the high voltage VPP through the high voltage VPP pump 18 of double structure, the present disclosure can satisfy both reliability and efficiency and isolate the power supply to the non-operational region according to the pumping operation region, reducing the current consumption.

Although embodiment of the present invention have been described for illustrative purposes, those skilled in the art will appreciate that various modifications, additions and substitutions are possible, without departing from the scope and spirit of the invention and the accompanying claims.

The present disclosure claims priority to Korean application 10-2008-0024990, filed on Mar. 18, 2008, the entire contents of which are incorporated herein by reference.

What is claimed is:

1. A high voltage pumping circuit comprising:
an initializing unit configured to receive a first enable signal being disabled when an external voltage is below a predetermined level to initialize a high voltage;
a first pump configured to receive the first enable signal being enabled when the external voltage is over the predetermined level to pump the high voltage;
a second pump for pumping the high voltage in response to a second enable signal and a first mode signal; and
a mode signal transmitting unit for generating a second mode signal in response to the second enable signal and the first mode signal,
wherein the driving of the initializing unit and the first pump is controlled in response to the second mode signal.

2. The high voltage pumping circuit of claim 1, wherein the initializing unit and the first pump are selectively enabled in response to the first enable signal.

3. The high voltage pumping circuit of claim 2, wherein the initializing unit includes:
a first driving unit for driving a first node in response to the first enable signal and the second mode signal; and
a second driving unit configured to initialize the high voltage as the external voltage in response to an output signal of the first driving unit.

4. The high voltage pumping circuit of claim 3, wherein the first driving unit includes:
a logic unit performing an OR operation in response to the first enable signal and the second mode signal; and
a buffer unit buffering an output signal of the logic unit.

5. The high voltage pumping circuit of claim 4, wherein the buffer unit includes:
a first pull-up device connected between the external voltage and the first node and comprising pull-up drive the first node in response to the output signal of the logic unit;
a first pull-down device connected between the first node and a ground voltage and comprising pull-down drive the first node in response to the output signal of the logic unit;
a second pull-up device connected between the external voltage and a second node and comprising pull-up drive the second node in response to an output signal of the first node;
a second pull-down device connected between the second node and the ground voltage and comprising pull-down drive the second node in response to the output signal of the first node;
a third pull-up device connected between the external voltage and a third node and comprising pull-up drive the third node in response to an output signal of the second node; and
a third pull-down device connected between the third node and the ground voltage and comprising pull-down drive the third node in response to the output signal of the second node.

6. The high voltage pumping circuit of claim 4, wherein the second mode signal is disabled in response to the enabling of the second enable signal which is enabled in a low power mode.

7. The high voltage pumping circuit of claim 3, wherein the second driving unit includes:
a first switching device connected between the high voltage and a fourth node and comprising turn on in response to the output signal of the first driving unit; and
a second switching device connected between the fourth node and the external voltage and comprising turn on in response to the second mode signal.

8. The high voltage pumping circuit of claim 3, wherein the initializing unit includes a level shifting unit connected between the first driving unit and the second driving unit and comprising driven in response to the first enable signal.

9. The high voltage pumping circuit of claim 8, wherein the level shifting unit shifts the level of the external voltage to the level of the high voltage.

10. The high voltage pumping circuit of claim 1, wherein the first pump is a high voltage pump of tripler structure.

11. The high voltage pumping circuit of claim 1, wherein the second enable signal is enabled in response to the level of the high voltage.

12. The high voltage pumping circuit of claim 1, wherein the first mode signal is disabled in a low power mode.

13. The high voltage pumping circuit of claim 1, wherein the second pump is a high voltage pump of doubler structure.

14. The high voltage pumping circuit of claim 1, wherein the mode signal transmitting unit includes:
a logic unit performing an OR operation in response to the second enable signal and the first mode signal; and
an inverter buffering an output signal of the logic unit.

15. A high voltage pumping circuit comprising:
an enable signal generating unit which generates first and second enable signals;
an initializing unit configured to receive a first enable signal being disabled when an external voltage is below a predetermined level and a second mode signal to initialize a high voltage;
a first pump configured to receive the first enable signal being enabled when the external voltage is over the predetermined level and the second mode signal to pump the high voltage;
a second pump which pumps the high voltage in response to the second enable signal and a first mode signal; and
a mode signal transmitting unit which generates the second mode signal in response to the second enable signal and the first mode signal.

16. The high voltage pumping circuit of claim 15, wherein the enable signal generating unit includes:
an external voltage sensing unit which generates the first enable signal which is enabled in response to a level of an external voltage; and
a high voltage sensing unit which generates the second enable signal which is enabled in response to the level of the high voltage.

17. The high voltage pumping circuit of claim 15, wherein the initializing unit and the first pump are selectively enabled in response to the first enable signal.

18. The high voltage pumping circuit of claim 15, wherein the first pump is a high voltage pump of tripler structure.

19. The high voltage pumping circuit of claim 15, wherein the first mode signal is disabled in a low power mode.

20. The high voltage pumping circuit of claim 15, wherein the second pump is a high voltage pump of doubler structure.

21. The high voltage pumping circuit of claim 15, wherein the second mode signal is disabled in response to the enabling of the second enable signal which is enabled in a low power mode.

22. A method for pumping a high voltage, the method comprising:
- initializing the high voltage in response to a first enable signal being disabled when an external voltage is below a predetermined level;
- pumping the high voltage by a first pump in response to the first enable signal being enabled when the external voltage is over the predetermined level;
- sensing a level of the high voltage and generating a second enable signal;
- pumping the high voltage by a second pump in response to the second enable signal; and
- generating a second mode signal in response to the second enable signal and a first mode signal,
- wherein the high voltage is initialized as the external voltage in response to the first enable signal and the second mode signal, and
- the first mode signal is disabled in a low power down mode.

23. The method of claim 22, wherein the first pump is a high voltage pump of tripler structure.

24. The method of claim 22, wherein the second enable signal is enabled in response to a level of the high voltage.

25. The method of claim 22, wherein the second pump is a high voltage pump of doubler structure.

26. The method of claim 22, wherein the second mode signal is disabled in response to enable of the second enable signal which is enabled in a low power mode.

* * * * *